April 5, 1966  G. P. WEST  3,243,897
SPACE VEHICLE MISSION PLANNER
Filed May 3, 1963  2 Sheets-Sheet 1
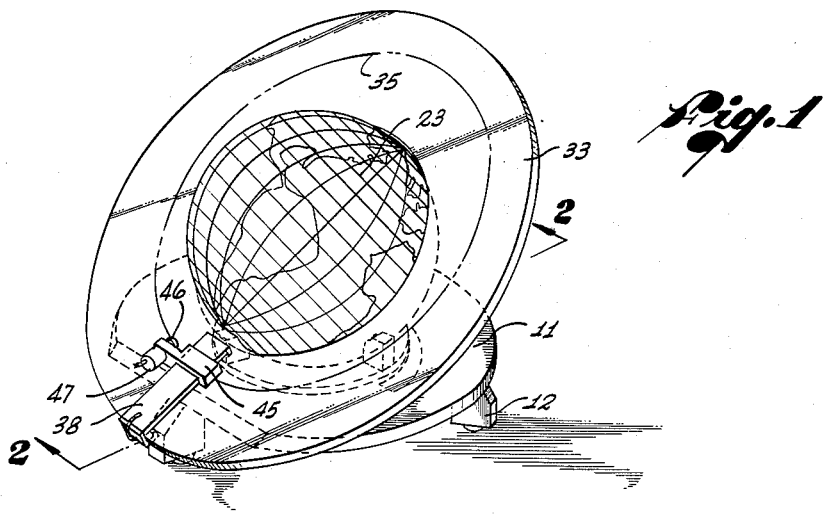
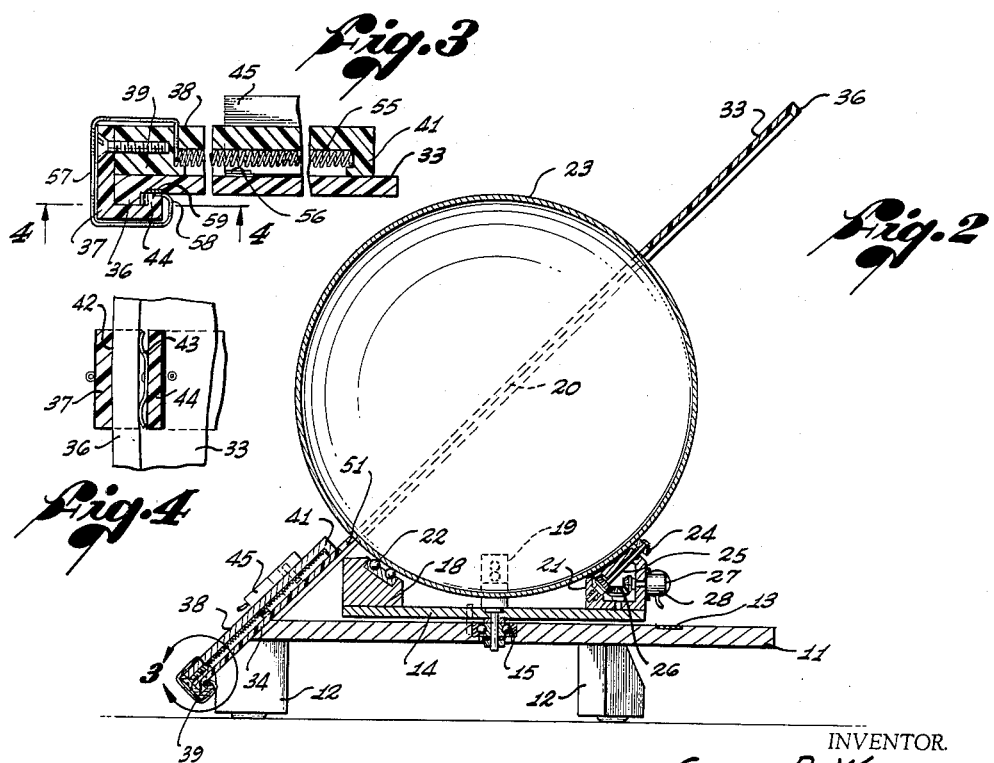
INVENTOR.
GEORGE P. WEST
BY Zulwider, Patton, Rieber
Lee and Utecht
ATTORNEYS April 5, 1966   G. P. WEST   3,243,897
SPACE VEHICLE MISSION PLANNER
Filed May 3, 1963   2 Sheets-Sheet 2
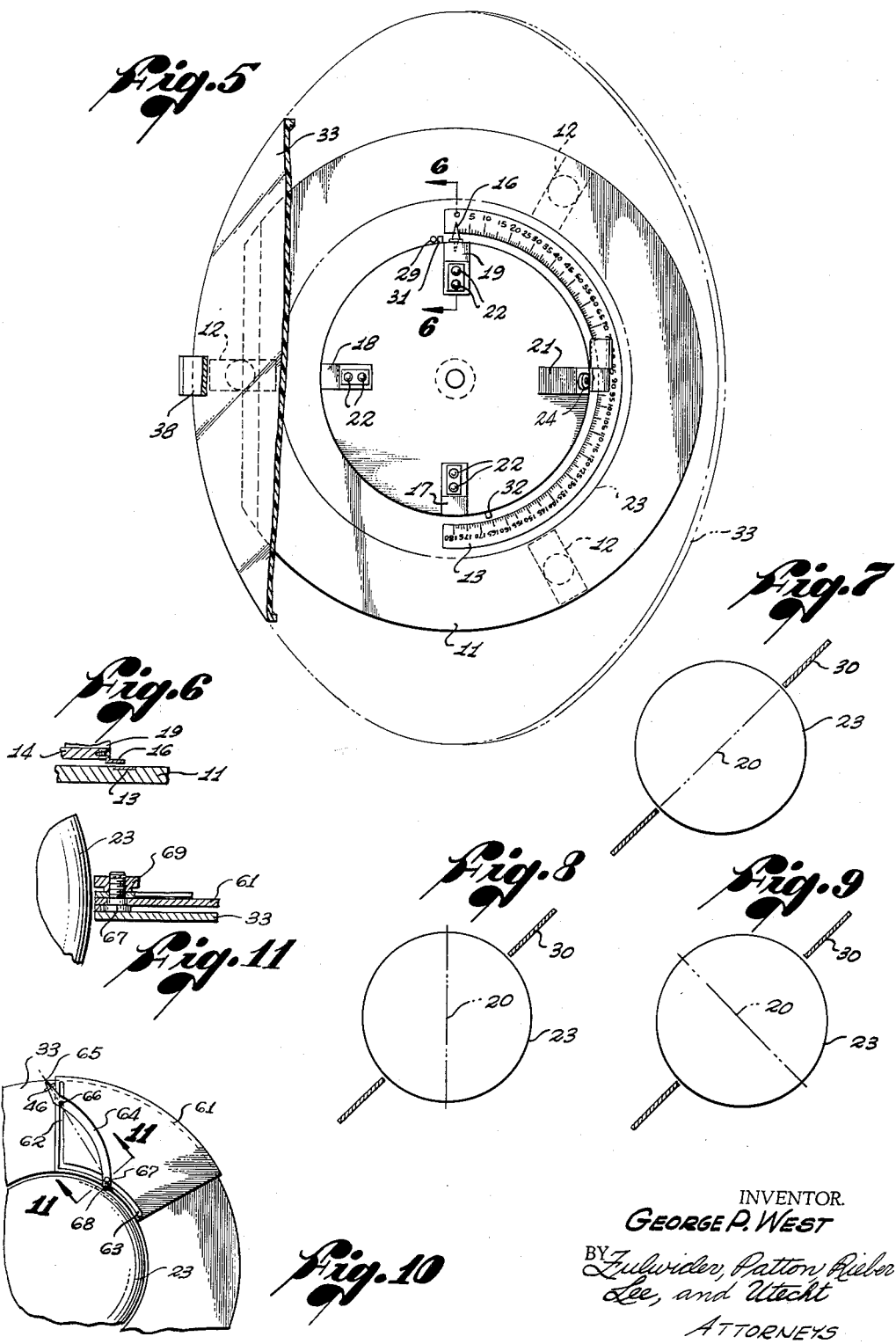
INVENTOR.
GEORGE P. WEST
BY Fulwider, Patton, Rieber
Lee, and Utecht
ATTORNEYS

United States Patent Office 3,243,897
Patented Apr. 5, 1966

3,243,897
SPACE VEHICLE MISSION PLANNER
George P. West, Palos Verdes, Calif., assignor to System Development Corporation, Santa Monica, Calif., a corporation of California
Filed May 3, 1963, Ser. No. 277,905
8 Claims. (Cl. 35—46)

The present invention relates to a device for planning space missions which maintains the proper relationship between the position of a space vehicle in orbit and the surface of the body around which the vehicle moves.

In planning space vehicle missions, particularly with respect to earth orbits, a quick approximate method of determining the region of the earth's surface which will be visible from the space craft at specified instants of time, or the locations on earth from which the space craft can be observed, is highly desirable. One of the ways in which this has been accomplished in the past is by the use of improvised overlays which define the region on earth from which the vehicle would be visible or the ground coverage of the space vehicle, which overlays are placed manually upon an ordinary world map globe to correspond to the position of the vehicle at any particular instant.

A presently preferred embodiment of a space vehicle mission planner according to the present invention provides a halo plane about a world map globe so that the orbit of the space vehicle can be plotted upon the halo plane. A cursor movable about the halo plane is provided to mark the position of the space vehicle in orbit at any instant of time. The world map globe is rotatably mounted within the halo plane with its axis of rotation and the halo plane relatively adjustable. The cursor is suitably coupled with the rotational drive of the map globe to impart appropriate rotation thereto as the cursor is guided to trace out the space vehicle's orbit on the halo plane.

A space vehicle moving in orbit may be considered as a point mass moving in a central force field. The motion of the space vehicle is consequently covered by Kepler's Third Law which requires that the space vehicle move in such a way that the area swept by the line joining the space vehicle and the center of mass is proportional to time. A planimeter wheel used as the cursor to trace out the orbit of the space vehicle upon the halo plane, with the pivot point of the planimeter at the center of the earth, rotates proportional to the time of flight of the space vehicle. The earth's rotation is also proportional to the elapsed time between successive observations of the satellite. Therefore, by coupling the planimeter wheel and the drive wheel for the world map globe, with appropriate gear ratios to accommodate the two proportionality factors of planimeter constant and earth's rotational rate, the desired positioning of the satellite cursor and the earth's surface will be accomplished. This assumes, of course, that the axis of rotation of the earth is properly located with respect to the orbital plane of the satellite represented by the halo. With an indirect servo-drive, as explained hereinafter, the planimeter wheel is not loaded and the possibility of slipping thereof is minimized so that accuracy is increased.

It is apparent that any desired read-off means may be provided, such as prismatic lenses at the cursor from which the globe's surface may be viewed, or prismatic lenses placed at radar locations on the globe's surface could measure radar look angles by sighting the cursor position therethrough.

It is therefore an object of the present invention to provide an improved orbital space vehicle mission planner giving a quick determination of the position of a space vehicle relative to the earth's surface at a given instant of time.

Another object of this invention is the provision of an improved planner for orbital space missions employing a rotatable map globe and means for moving a space vehicle cursor thereabout in synchronous relation and in the proper relative plane to give a continuous instantaneous representation of the position of the space vehicle relative to the surface of the globe.

Another object of this invention is the provision of an improved device for representing the position of an orbiting space vehicle relative to the surface of the body about which it is orbiting, at any given instant of time.

A further object of this invention is the provision of an improved planner for representing the position of an orbiting space vehicle relative to the earth's surface, employing a rotatable world globe having a halo plane thereabout upon which the orbit of a space vehicle may be plotted, and a cursor movable to follow the plotted orbit, and in which the cursor and globe are interconnected for synchronized movement.

Yet another object of the invention is the provision of an improved space mission planner in accordance with the immediately preceding object in which the cursor for the halo plane includes a planimeter wheel movable over the plotted orbit of the space vehicle to give a rotation to the wheel proportional to the time of flight of the space vehicle.

These and other objects and features of the invention will be readily apparent to those skilled in the art from the following specification and the appended drawings of a presently preferred embodiment of the invention in which:

FIGURE 1 is a perspective view of a space mission planner according to the present invention;

FIGURE 2 is a vertical sectional view through the device of FIGURE 1, taken on a central plane including the line 2—2 of FIGURE 1;

FIGURE 3 is a detailed sectional view within the circle 3 of FIGURE 2;

FIGURE 4 is a detailed sectional view on the line 4—4 of FIGURE 3;

FIGURE 5 is a plan view of the planar device according to the present invention with the world globe removed and the halo broken away;

FIGURE 6 is a detailed sectional view at the line 6—6 of FIGURE 5;

FIGURE 7 is a schematic representation of the axis of the world globe and the halo plane adjusted to represent a polar orbit;

FIGURE 8 is a schematic representation of an intermediate angular relation between the orbital halo plane and the axis of globe rotation;

FIGURE 9 shows the axis of the globe adjusted to represent an equatorial orbit;

FIGURE 10 is a plan view of a modification of the invention employing a polar planimeter arrangement; and FIGURE 11 is a detail sectional view on the line 11—11 of FIGURE 10.

In the embodiment of the invention specifically illustrated in the drawings there is provided a substantially horizontal table 11 supported on legs 12 and carrying on its top surface a semicircular scale 13 bearing angular indicia from 0 to 180 degrees, as shown in FIGURE 5. A globe supporting base 14 is mounted for rotation above the table 11 in a bearing 15 and the base 14 has a pointer 16 mounted at the edge thereof cooperating with the indicia on the scale 13 to indicate the position of the drive wheel, the angular relationship between the spin axis of the globe and the orbital plane of the satellite vehicle being one-half the indicia reading.

Upon the upper surface of the base 14 are mounted four supports 17, 18, 19 and 21. The supports 17, 18 and 19 carry bearing balls 22 upon which a world map globe 23 is supported for rotation. The support 21 carries a drive wheel 24 engaging the surface of the globe 23 to effect rotation thereof. The drive wheel 24 is carried by a shaft 25 rotatably mounted in the support 21 and driven through a gear train 26 and gear box 28 by a servo-motor 27. The globe 23 is mounted on the supporting base 14 so that its polar axis is parallel to the axis of the shaft 25. Conveniently, these axes are located at angles of 45 degrees to the vertical and horizontal so that the drive wheel 24 engages the world globe equatorially.

The table 11 is preferably provided with a stationary stop 29 which is engaged by pins 31 and 32 on the edge of base 14 to limit the opposite extreme positions of rotation of the base to 180 degrees apart, conforming in one extreme position to a polar orbit for the satellite vehicle and in the opposite extreme position to an equatorial orbit for the satellite vehicle.

The orbital plane of the satellite vehicle is represented by a flat halo ring or annulus 33 which may conveniently be of plastic material and which is rigidly secured to the table 11 at 34, as by cementing or other mechanical attachment. In the construction illustrated, the halo ring 33 is located for viewing convenience at an angle of 45 degrees and the plane of the halo passes through the center of the world globe 23, as shown more particularly in FIGURE 2. FIGURE 2 also shows the base 14 in its polar-orbit extreme position, conforming to FIGURE 7, with the pointer 16 at the 0 degree indicia on the scale 13. The axis of rotation of the globe 23 thereby lies in the halo plane, as in the case of a polar orbit for the space vehicle.

The upper surface of the halo ring 33 provides a writing surface upon which a trace may be made by an ordinary lead pencil or by a grease pencil. Upon this surface the orbit of the space vehicle is plotted at 35 to any desired scale, for which compensation may be made in the connection between the orbit cursor and the drive wheel 24, either electrically or mechanically.

The outer edge of the halo ring 33 is circular about the center of the globe and has a flange 36 slidably and resiliently engaged by an L-shaped retainer member 37 supporting a cursor plate 38 on the upper surface of the halo and spaced therefrom by end flanges 39 and 41. The long axis of the plate 38 extends radially of the halo ring 33 and is held in this position by the cooperating curved surfaces 42 on the interior of the L-shaped member 37. The surfaces 42 are maintained engaged by a spring member 43 disposed between the flange 36 and a flange 44 at the inner edge of the L-shaped member 37. Upon the cursor plate 38 is slidably mounted a carrier 45, movable longitudinally of the plate 38 and therefore radially of the halo ring 33. Upon the carrier 45 is mounted a planimeter wheel 46 and an electrical pick-off element 47 rotated thereby. The planimeter wheel 46 is moved over the surface of the halo ring 33 along the orbital path 35 by circumferential movement bodily of the plate 38, and by radial movement of the carrier 45 longitudinally of the plate 38. The planimeter wheel thereby moves about the center of the globe 23.

With the axis of rotation of the planimeter wheel fixed radially as previously described, a factor proportional to the radial distance of the wheel from the center of the globe should be entered electrically into the servo-drive to make the rotation of the globe proportional to the area swept out by the satellite. For this purpose, there is provided a radially extending potentiometer 55 on the underside of the cursor plate 38 which is engaged by a slide pickoff 56 on the carrier 45. One end of potentiometer 55 is connected by a lead 57 to a brush 58 sliding on a conducting ring 59 from which the potentiometer is engaged.

With the base 14 in the position illustrated in FIGURES 1, 2 and 5, the axis of rotation of the world globe 23 is in the orbital plane of the satellite vehicle, as represented by the halo ring 33. This conforms to the polar orbit for the satellite vehicle shown in FIGURE 7, wherein the orbital plane is designated 30 and the axis of earth rotation 20.

FIGURE 8 represents a mission with the orbital plane of the satellite vehicle at an angle of 45 degrees to the axis of rotation of the earth. To simulate this mission in the space vehicle mission planner, the base 14 is rotated to place the pointer 16 at the 90 degree point on the scale 13.

FIGURE 9 represents an equatorial orbit for the space vehicle in which the orbital plane is at right angles to the axis of rotation of the earth. This position is simulated on the space mission planner by rotating the base 14 until the pointer 16 is aligned with 180 degrees on the scale 13, this being the opposite extreme position of the base 14 from that shown in full lines in the drawings.

It is therefore seen that in the specific embodiment of the invention illustrated, the angular relationship between the orbital plane of the space vehicle and the axis of rotation of the earth is simulated in the space mission planner by rotating the axis of rotation of the globe while the halo ring remains as a stationary reference. It is, of course, within the spirit of the invention to have the axis of the globe stationary and the halo ring 33 movable relative to this stationary axis of rotation. However, for convenience of reading and simplicity of mechanical construction, it is preferred to maintain the halo ring stationary and to simulate the relative positioning of the plane and the earth's axis of rotation by rotating the axis of rotation of the globe relative to the halo ring.

In all positions of the axis of rotation 20, it must be maintained parallel to the shaft 25 so that actual rotation of the globe 23 is effected about the polar axis of the earth which it simulates.

With the drive wheel 24 located equatorially of the world globe 23 and the halo ring 33 at an angle of 45 degrees, it is necessary to provide a clearance at 51 at the lower inner edge of the halo ring 33 so that the base 14 may rotate through a full 180 degrees with respect to the table 11 and halo ring 33.

While an equatorial position for the drive wheel 24 has been shown for simplicity and convenience, it is possible to locate the wheel at positions of lower latitude, with the proper correction inserted in the drive between the pick-off 47 and the servo-motor 27. For example, if the wheel 24 is located at an angle of 15 degrees to the vertical, but on the same side thereof as shown in FIGURE 2, the wheel 24 will rotate about a circle of constant latitude to enter a correction factor of .866 into the drive. Any other desired angle may be selected with a suitable correction factor in the rotation of the globe corresponding to a given rotation of the planimeter wheel 46. One advantage of so lowering the drive wheel 24 is that the clearance at the lower inner edge of the halo ring 33 provided at 51 is no longer required, and the cursor plate 38 can be supported at both the interior and exterior edges of the halo ring.

As previously stated, the drive from the planimeter wheel 46 to the globe drive wheel 24 can be mechanical, with suitable gear ratios taking care of the planimeter constant and the earth's rotational rate, but such direct mechanical drive loads the planimeter wheel so that slipping thereof may occur. A more accurate arrangement is that shown in the drawings in which an electrical pick-off 47 rotates in accordance with the rotation of the planimeter wheel 46 to drive the servo-motor 27, and the two proportionality factors can be taken care of, either electrically in known manner, or mechanically in the gear box 28. Such electrical servo-drives are well known and can be embodied (by way of example only) in self-synchronous devices wherein a self-synchronous receiver motor 27 angularly follows the rotation of a self-synchronous transmitter 47.

In operating the space vehicle mission planner according to the present invention, the orbit of the space vehicle is calculated and is plotted on the surface of the halo ring 33 at 35. The cursor represented by the planimeter wheel 46 may be at any position along the orbital path 35, and its position relative to the surface of the earth can be calculated for the instant of time represented by the position of the planimeter wheel on the orbit. The base 14 is rotated to properly locate the pointer 16 with respect to the indicia on the scale 13 to properly locate the axis of rotation 20 of the earth with respect to the orbital plane of the space vehicle represented by the halo ring 33. The world globe is then raised from the drive wheel 24 and rotated to place the proper surface area opposite the planimeter wheel 46 representing the space vehicle. With the surface of the globe 23 thus initially located with respect to the planimeter wheel 46, movement of the planimeter wheel 46 along the orbital path 35, representing movement of the space vehicle in its orbit about the earth, will effect proportional rotation of the earth so that the planimeter wheel 46 and the surface of the globe 23 will be positioned in the same manner as the space vehicle and the surface of the earth, for the same elapsed time. As stated before, the globe 23 will always be located within its supports on the base 14 so that the axis of rotation 20 is parallel to the axis of the shaft 25 so that rotation of the globe 23 simulates rotation of the earth about its polar axis.

It will be understood that the cursor plate 38 extends radially with respect to the halo ring 33 and that the plane of the halo ring passes through the center of the globe 23. Therefore, the planimeter wheel 46 traces out the orbital path 35 of the space vehicle about the center of the globe, so that the revolutions of the planimeter wheel will be proportional to the time of flight of the vehicle, regardless of the shape of the orbital path and the area enclosed thereby. Since the revolutions of the planimeter wheel are proportional to the time of flight of the vehicle, the drive between the planimeter wheel 46 and the globe drive wheel 24 is linear, with appropriate ratios to accommodate the two proportionality factors of planimeter constant and the earth's rotational rate. The radial position of the planimeter wheel is compensated for by the signal from the pickoff slide 56.

It will be readily understood that by locating a prismatic lens at the planimeter wheel 46, sightings may be made to determine the surface of the earth visible from the space vehicle at any desired instant of time, since this will conform to the area on the globe 23 visible through the lens at this particular instant. Similarly, lenses may be placed on the surface of the world globe 23 conforming to radar locations, and sightings therefrom can be utilized to measure radar look angles to a space vehicle whose position is represented by the planimeter wheel cursor 46.

FIGURE 10 illustrates a polar planimeter construction which may advantageously be substituted for the radial planimeter previously described, in which case no correction need be made for the radial distance of the planimeter wheel from the center of the globe. This construction employs a large cursor plate 61 extending through approximately 60 degrees, having a radial slot 62 at one edge and a circumferential slot 63 at its inner edge. A tracing arm 64 has a tracing point 65 at one end and carries adjacent thereto the planimeter wheel 46 which will be connected to an electrical pickoff such as the element 47 illustrated in the radial potentiometer embodiment. A pin 66 near the planimeter wheel carrying end of the arm 64 slides in the radial slot 62. A collared stud 67, attached adjacent to the other end of the arm 64, rides in the circumferential slot 63. The stud 67 preferably has an adjustable calibrating connection to the arm 64 provided by a slot 68 and nut 69. This adjustment permits compensation for slight errors in gear ratio or in the proportionality factor of the servo-drive.

The effect of the described mounting for the arm 64 and the operation of the pins 66 and 67 in the slots 62 and 63, respectively, is the same as if the arm 64 had its tracing end free and its opposite end pivoted on one end of a second arm whose other end was pivoted at the center of the globe.

The polar planimeter varies the inclination of the rotational axis of the planimeter wheel, introducing slippage of the wheel in an amount to provide the necessary compensation for the radial distance of the wheel from the center of the globe. In this construction, the rotational axis of the planimeter wheel 46 should be made parallel to the axis of the tracing arm 64, the effective axis being the line interconnecting the pins 66 and 67. The arm 64 is curved, as shown, to clear the map ball in the extreme globeward position of the arm 64 for a minimum orbital height.

While a certain preferred embodiment of the invention has been specifically illustrated and described, it will be understood that the invention is not limited thereto, as many variations will be apparent to those skilled in the art, and the invention is to be given its broadest interpretation within the terms of the following claims.

I claim:

1. A device for representing an orbital space mission comprising: a map globe; means mounting said globe for rotation about a polar axis; means for rotating said globe about said axis; means providing a representation of an orbital plane passing through the center of said globe and providing a surface upon which an orbital path of any shape may be plotted; a cursor movable in said orbital plane along said path; and means interconnecting said cursor with said globe rotating means to effect rotation of the globe by and synchronously with the movement of the cursor along the orbital path so as to give an instantaneous representation of the position of the space vehicle represented by the cursor relative to the surface of the body represented by the globe.

2. A device for representing an orbital space mission comprising: a map globe; means mounting said globe for rotation about a polar axis; means for rotating said globe about said axis; means providing a representation of an orbital plane passing through the center of said globe and providing a surface upon which an orbital path of any shape may be plotted; a cursor representing a space vehicle movable in said orbital plane about the globe along said orbital path; means for effecting initial relative adjustment between said polar axis and said orbital plane to give a true representation of the orbital path of the space vehicle relative to the body represented by the globe and thereafter maintaining said adjustment fixed during movement of the cursor; and means interconnecting said cursor with said globe rotating means to effect rotation of the globe by and synchronously with the movement of the cursor along the orbital path to give an instantaneous representation of the position of the space vehicle represented by the cursor relative to the surface of the body represented by the globe.

3. A device for representing an orbital space mission comprising: a map globe; means mounting said globe for rotation about a polar axis; means for rotating said globe about said axis; means providing a representation of an orbital plane passing through the center of said globe and providing a surface upon which an orbital path of any shape may be plotted; a cursor representing a space vehicle movable in said orbital plane about the globe along said orbital path; means effecting initial relative adjustment between said polar axis and said orbital path of the space vehicle relative to the body represented by the globe and thereafter maintaining said adjustment fixed during movement of the cursor; means interconnecting said cursor with said globe rotating means to effect rotation of the globe by and synchronously with the movement of the cursor along the orbital path so as to give an instantaneous representation of the position of the space vehicle represented by the cursor relative to the surface of the body represented by the globe; and means for effecting initial relative adjustment between the surface of the globe and the cursor to establish the relationship therebetween for a given instant of time.

4. A device for representing an orbital space mission comprising: a map globe; means mounting said globe for rotation about a polar axis; means for rotating said globe about said axis; means providing a representation of an orbital plane passing through the center of said globe and providing a surface upon which an orbital path of any shape may be plotted; a cursor representing a space vehicle movable in said orbital plane about the globe along said orbital path; means for effecting initial relative adjustment between said polar axis and said orbital plane to give a true representation of the orbital path of the space vehicle relative to the body represented by the globe and thereafter maintaining said adjustment fixed during movement of the cursor; and means interconnecting said cursor with said globe rotating means to effect rotation of the globe by and synchronously with the movement of the cursor along the orbital path so as to give an instantaneous representation of the position of the space vehicle represented by the cursor relative to the surface of the body represented by the globe, said cursor including a planimeter wheel movable against the orbital plane surface in the path of the orbital vehicle about a center of rotation coinciding with the center of the globe whereby the rotation of the planimeter wheel is proportional to the time of flight of the space vehicle.

5. A device for representing an orbital space mission comprising: a map globe; means mounting said globe for rotation about a polar axis; means for rotating said globe; means providing a representation of an orbital plane passing through the center of said globe and providing a surface upon which an orbital path of any shape may be plotted; a cursor representing a space vehicle movable in said orbital plane along said path; means for effecting initial relative adjustment between said polar axis and said orbital plane to give a true representation of the orbital path of the space vehicle relative to the body represented by the globe and thereafter maintaining said adjustment fixed during movement of the cursor; means interconnecting said cursor and said globe rotating means to effect rotation of the globe by and synchronously with the movement of the cursor along the orbital path to represent the position of the space vehicle relative to the surface of the body represented by the globe at any given time, said cursor including a planimeter wheel movable on the orbital plane surface along the orbital path about a center of rotation coinciding with the center of the globe so that the rotation of the planimeter wheel is proportional to the time of flight of the space vehicle; a self-synchronous transmitting device rotated by said planimeter wheel; and a self-synchronous receiver motor energized from said transmitter for rotating said globe.

6. A device for representing an orbital space mission comprising: a map globe; means mounting said globe for rotation about a polar axis; means for rotating said globe; means providing a representation of an orbital plane passing through the center of said globe and providing a surface on which an orbital path of any shape may be plotted; a cursor representing a space vehicle movable in said orbital plane along said orbital path; means for effecting initial relative adjustment between said polar axis and said orbital plane to give a true representation of the orbital path of the space vehicle relative to the body represented by the globe and thereafter maintaining said adjustment fixed during movement of the cursor; means interconnecting said cursor and said globe rotating means to effect rotation of the globe by and synchronously with the movement of the cursor along said orbital path to give an instantaneous representation of the position of the space vehicle relative to the surface of the body represented by the globe, said cursor including a planimeter wheel movable on the orbital plane surface along the orbital path about a center of rotation coinciding with the center of the globe so that the rotation of the planimeter wheel is proportional to the time of flight of the space vehicle; and means for effecting initial relative rotation between the globe and the planimeter wheel to establish the relationship between the position of the planimeter wheel and the surface of the globe for a given instant of time in the flight of the orbiting vehicle.

7. A device for representing an orbital space mission comprising: a map globe; means mounting said globe for rotation; means for rotating said globe; means providing a plane surface about said globe on which is disposed a representation of a calculated orbital path of any shape; a cursor including a planimeter wheel movable on said plane surface in said orbital path about a center of rotation coinciding with the center of said globe; an electrical pick-off driven by said planimeter wheel, said globe rotating means including a servo motor; and means energizing said servo motor from said pick-off to effect rotation of the globe by and synchronously with the movement of the cursor along said orbital path.

8. A device for representing an orbital space mission comprising a map globe; means mounting said globe for rotation about a polar axis; means for rotating said globe about said axis; means providing a representation of an orbital plane passing through the center of said globe and providing a surface on which an orbital path of any shape may be plotted; a cursor including a planimeter wheel movable on said surface along a plotted orbital path about a center of rotation coinciding with the center of said globe; and means interconnecting said planimeter wheel with said globe rotating means to effect rotation of the globe by and synchronously with the movement of the cursor along the orbital path so as to give an instantaneous representation of the position of the space vehicle represented by the cursor relative to the surface of the body represented by the globe.

References Cited by the Examiner

UNITED STATES PATENTS

| | | | |
|---|---|---|---|
| 1,384,801 | 7/1921 | Ferrari | 35—45 |
| 2,957,252 | 10/1960 | Pain | 35—46 |
| 2,963,798 | 12/1960 | Trippensee et al. | 35—45 |
| 2,967,358 | 1/1961 | Fay et al. | 35—46 |
| 3,027,656 | 4/1962 | Sittig | 35—46 |
| 3,028,687 | 4/1962 | Johnson | 35—46 |

EUGENE R. CAPOZIO, *Primary Examiner.*

JEROME SCHNALL, *Examiner.*

HARLAND S. SKOGQUIST, *Assistant Examiner.*